Patented Apr. 7, 1953

2,634,244

UNITED STATES PATENT OFFICE 2,634,244

CELLULAR PLASTICS HAVING FOAM STABILIZING ADDITIVES

Eli Simon, Los Angeles, and Frank W. Thomas, Burbank, Calif., assignors to Lockheed Aircraft Corporation, Burbank, Calif.

No Drawing. Application November 9, 1950, Serial No. 194,934

14 Claims. (Cl. 260—2.5)

This invention relates to foamed or cellular plastic products and relates more particularly to cellular alkyd-resin polyisocyanate plastics incorporating foam or cell stabilizing additives.

Our copending applications Serial No. 35,294, filed June 25, 1948, now Patent Number 2,577,279, issued December 4, 1951; Serial No. 44,993, filed August 18, 1948, now abandoned; Serial No. 50,007, filed September 18, 1948, now Patent Number 2,577,280, issued December 4, 1951; Serial No. 54,822, filed October 15, 1948, now Patent Number 2,577,281, issued December 4, 1951; and Serial No. 77,058, filed February 17, 1949, now Patent Number 2,591,884, issued April 8, 1952, are directed to low-density cellular foamed plastic products prepared by mixing the ingredients and pouring the reactant mixture in place, for example in a mold, or the like, and then allowing the mixture to react at atmospheric pressure and temperatures. These mixtures were essentially systems comprising an alkyd-resin, meta-toluene diisocyanate, water and additives, such as metallic leafing powders, metallic soap powders, ethyl cellulose, or other high molecular weight resins for controlling or stabilizing the foaming action of the reactant mixture.

We have discovered that the incorporation of one or more quaternary ammonium bentonite complexes in such alkyd-resin polyisocyanate foaming systems makes it unnecessary to employ the other additives such as the metallic leafing powders, metallic soap powders, high molecular weight resins, etc. and results in superior high strength, low-density cellular plastic products. The quaternary ammonium bentonite complexes or bentonite salts of quaternary ammonium compounds which we employ as the foam stabilizers in the production of the cellular reaction products of the alkyd-resin polyisocyanate mixtures, are obtained by the reaction of bentonite with organic bases or salts of organic bases through base exchange in which calcium, sodium, potassium, magnesium and other replaceable bases of the silicate component or components of the bentonite enter into double decomposition with the cations of organic bases. These quaternary ammonium bentonite complexes, whose definition and mode of preparation will be more fully set forth, serve the important function of stabilizing the rising foam structure of the poured alkyd-resin polyisocyanate reactant mixture, preventing collapse of the cells, and minimizing the loss of gas from the reacting rising mass. While we do not wish to be restricted to any given theory, it appears that the effectiveness of these foam stabilizing additives is due, in part at least, to their properties of swelling and dispersing in the polyisocyanate of the reactant mixture. The effectiveness of the additives may also be due to their ability to act as catalytic agents through the quaternary ammonium group as well as their metallic constituents that are soluble to some extent in the polyisocyanate.

It is, therefore, a general object of the invention to provide formulations and methods of making low-density cellular plastics of good or superior physical properties characterized by the employment of these bentonite complexes to stabilize and control the gas cell structure during the rising and foaming of the cellular mass.

Other objectives and features of the invention will become apparent from the following detailed description of several typical examples of the invention and the manner of preparing the same.

The invention provides, generally, the preparation or mixing of an alkyd resin, a diisocyanate and one or more foam stabilizers selected from a group of bentonite complexes, the pouring or application of this reactant mixture, and the reaction of the mixture at normal room temperatures and atmospheric pressure, with or without a post-curing at somewhat elevated temperatures.

The resins which we prefer to employ are alkyd resins, that is the reaction products of polyhydric alcohols and polybasic acids unmodified or modified with oil and/or other resins, or the reaction products of one or more polyhydric alcohols and oxalic acid with or without other dibasic acids and either unmodified or modified with oil or other resins. The resins preferably have an acid number of from 5 to 175, a water content of from 0.1% to approximately 3.0% by weight, and having the following ratio range of the hydroxyl to the carboxyl groups in the alkyd resin reactants:

From 3 hydroxyl (OH) :1 carboxyl (COOH)
To 4 hydroxyl (OH) :5 carboxyl (COOH)

It may usually be preferred to employ alkyd resins having an acid number between 10 and 25 and wherein the ratio of the hydroxyl groups to the carboxyl groups is 2 to 1. The following are formulae suitable for the preparation of alkyd resins adapted for employment in the preparation of the products of this invention, it being understood that our above identified applications contain certain disclosures of other resins likewise adapted for incorporation in the products of this invention.

*Resin A*

| | Mols |
|---|---|
| Trimethylol propane | 4 |
| Adipic acid | 2½ |
| Phthalic anhydride | ½ |

Resin B

| | Mols |
|---|---|
| Glycerol | 4 |
| Adipic acid | 2½ |
| Phthalic anhydride | ½ |

Resin C

| | Mols |
|---|---|
| Oxalic acid | 2½ |
| Dimer acids | 1/16 |
| Trimethylol propane | 3 9/16 |

Resin C is an example of an oxalate alkyd resin prepared from oxalic acid and a polyhydric alcohol and oil modified, the only dibasic acid employed being the oxalic acid. Our copending application, Serial No. 186,500, filed September 23, 1950, discloses other oxalate alkyd resins, any of which are adapted for use in the formulations of the present application. The dimer acids, included in Resin C above, are dimeric polymers of unsaturated fatty acids such as dimerized linoleic or linolenic acids. These dimer acids have been prepared by heating the methyl esters of poly unsaturated acids such as linoleic or linolenic acids at high temperatures. The mechanism of reaction may be represented diagrammatically by a Diels-Alder reaction where two molecules of linoleic acid combine to form the dilinoleic acid (dibasic unsaturated acid) as follows:

$$2CH_3(CH_2)_5CH=CH-CH=CH(CH_2)_7COOH$$

$$\longrightarrow \begin{array}{c} CH_3(CH_2)_5-CH-CH-CH=CH(CH_2)_7COOH \\ | \quad | \\ CH_3(CH_2)_5-CH \quad CH-(CH_2)_7COOH \\ | \quad | \\ CH=CH \end{array}$$

The polyisocyanate employed in preparing the reactant cellular plastic producing mixture is preferably meta-toluene diisocyanate. The diisocyanate is used in the proportion of from 35 to 150 grams for each 100 grams of the alkyd resin or the oxalate alkyd resin.

While, as above pointed out, the employment of the bentonite complexes, to be more fully described below, make it unnecessary to employ other additives for producing cellular products for given uses or applications, to incorporate other additives in the reactant mixtures. Such additional additives include metallic leafing powders, metallic soap powders, flame retardant additives, and high molecular weight thermoplastic film forming polymeric resin additives. The metallic leafing powders which we have found to be effective in the formulations of the invention include:

- Aluminum leafing powder
- Aluminum bronze leafing powder
- Gold bronze leafing powder
- Copper bronze leafing powder
- Lead leafing powder
- Nickel leafing powder
- Silver leafing powder
- Gold leafing powder
- Copper leafing powder
- Stainless steel leafing powder Such metallic leafing powders are employed individualy or in suitable mixtures or combinations in the proportion of from 1/16 to 7½ grams for each 30 grams of the alkyd resin or oxalate alkyd resin. Excellent results are obtainable by employing aluminum leafing powder of such fineness that not more than 2% is retained on a No. 325 sieve and by employing aluminum bronze leafing powder, gold bronze leafing powder, and copper bronze leafing powder of such fineness that not more than 0.3% is retained on a No. 100 sieve.

The metallic soap powders suitable for incorporation in the reactant mixture are metallic soap powders of fatty acids having from 12 to 20 carbon atoms such as:

- Zinc stearate
- Aluminum stearate
- Calcium stearate
- Magesium stearate
- Magnesium hydroxy stearate
- Barium stearate
- Zinc laurate
- Calcium oleate
- Strontium stearate The proportion of the metallic soap powder or blends or combinations of soap powder employed may range from 1/16 to 7½ grams for each 30 grams of the alkyd resin or oxalate alkyd resin. Excellent results are obtainable when both a metallic leafing powder and a metallic soap powder are incorporated in the alkyd resin-polyisocyanate mixture. Such a combination of fillers or additives appears to act synergistically, that is the combination causes the formation of a greater volume of the cellular plastic than if the same proportionate quantity of each individual filler is used separately in the identical alkyd resin-polyisocyanate reactant mixture. When both the metallic leafing powder and metallic soap powder are used in the formulations of the invention, the metallic leafing powder may be used in the proportion of from 1/16 to 5 grams for each 30 grams of the alkyd resin or oxalate alkyd resin and the metallic soap powder may be used in the proportion of from 1/16 to 5 grams for each 30 grams of the alkyd resin or oxalate alkyd resin.

One class of flame retardant additives that may be added to the alkyd resin-polyisocyanate reactant mixture to render the resultant cellular plastic product flame resistant and self-extinguishing when once ignited, are aliyl esters of aryl phosphonic acids, namely compounds having the general formula ArPO(OCH₂CR:CHR¹)₂ where Ar represents aryl and alkaryl hydrocarbon radicals and R and R¹ are hydrogen and alkyl hydrocarbon radicals. Compounds of this character are described in United States Letters Patent No. 2,425,765 issued August 19, 1947, and include:

1. Diallyl benzene phosphonate

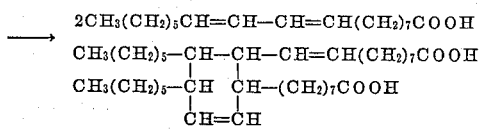

2. Bis(methallyl) benzenephosphonate

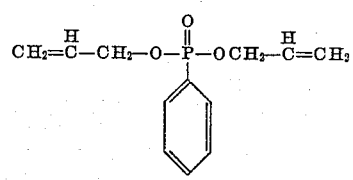

and

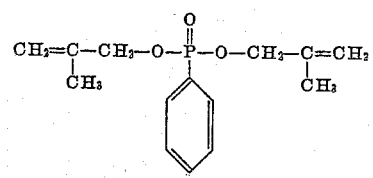

3. Diallyl toluene phosphonate

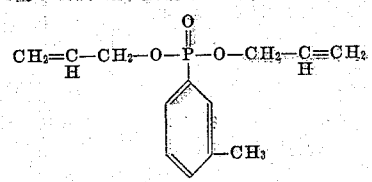

These additives not only serve to impart flame resistance to the foamed plastic product and to decrease flame propagation but also serve to materially decrease the density of the foamed material. In practice, from 1 gram to 20 grams of the additive may be used with each 30 grams of the alkyd resin or the oxalate alkyd resin. In most instances it is preferred to employ approximately 5 grams of the additive for each 30 grams of the resin.

Other flame-proofing and fire retardant agents may be employed instead of, or in addition to, the unsaturated alkyl esters of aryl phosphonic acids described above. Such agents include tri-chloralkyl phosphates of the general formula:

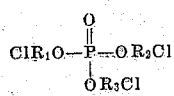

where $R_1$, $R_2$ and $R_3$ are alkyl groups having from 2 to 4 carbon atoms, antimony oxide $Sb_2O_3$ and unsaturated alkyl esters of alkenyl phosphonic acids of the class described in United States Letters Patent No. 2,425,766 issued August 19, 1947, namely compounds having the general formula:

$$R^2R^3C:CR^4PO(OCH_2CR:CHR^1)_2$$

where R, $R^1$ and $R^4$ are hydrogen or alkyl and $R^2$ and $R^3$ are hydrogen, alkyl or aryl radicals. Examples of the tri-chloralkyl phosphates that are effective in the formulations of the invention are:

Tri-B-chlorethyl phosphate

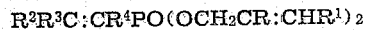

and

Tri-chlorpropyl phosphate $$(Cl-C_3H_7-O)_3-PO$$

Examples of the allyl esters of alkenyl phosphonic acids which we have found to be practical and effective in the cellular plastic formulations are:

Diallyl isobutene phosphonate

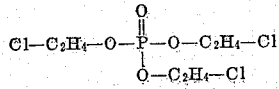

Diallyl styrene phosphonate

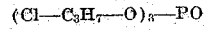

and

Bis(methallyl) styrene phosphonate

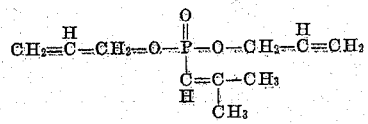

The allyl esters of aryl phosphonic acids, the allyl esters of alkenyl phosphonic acids and the trichloralkyl phosphates serve to facilitate mixing of the alkyd or oxalate alkyd resins and the diisocyanate by acting as mutal solvents for both and this tends to avoid premature reaction prior to the final pouring of the reactant mixture. This is important as it permits the utilization of higher water content alkyd resins which may be employed when a reduced density foamed plastic product is desired. The antimony oxide in addition to serving as a flame-proofing agent acts as a cell size regulator so that the cells of the foamed plastic may be of smaller size. The allyl esters of alkenyl phosphonic acids may be used in the proportion of from 1 to 20 grams for each 30 grams of the alkyd or oxalate alkyd resin when employed without the allyl esters of aryl phosphonic acids previously named, and when the allyl esters of ankenyl phosphonic acids and the allyl esters of aryl phosphonic acids are both employed their total proportion may be from 1 to 20 grams for each 30 grams of the resin. The trichloralkyl phosphates may be used in the proportion of from ½ to 10 grams for each 30 grams of the alkyd resin and when used with the allyl esters of aryl phosphonic acids in the proportion above named, may be employed in the proportion of from ½ to 7½ grams for each 30 grams of the alkyd resin. The antimony oxide may be used in the proportion of from ¼ to 5 grams for each 30 grams of the alkyd resin with or without the addition of the allyl esters of aryl phosphonic acids or the trichloralkyl phosphates.

The above mentioned high molecular weight thermoplastic film forming polymeric resin additives which we have found to be useful and effective in the formulations of the invention include:

Ethyl cellulose
Chlorinated natural rubber
Benzyl cellulose
Natural rubber
Vinyl chloride-vinyl acetate copolymers
Polyvinyl chloride
Polyvinyl acetate
Polystyrene
Polydichloro styrene
Acrylate and methacrylate resins and their copolymers
Polyvinyl butyral In general, a concentration of the high molecular weight polymeric thermoplastic resin additives of approximately 2 grams for each 100 grams of the meta-toluene diisocyanate gives excellent results. The concentrations or proportions of the individual additives depend to a considerable extent upon the nature of the additives and the concentrations of the additives are somewhat dependent upon their respective viscosity grades. For example, the polymeric chlorinated natural rubber may be used in the proportion of from 5 to 20 grams for each 100 grams of the meta-toluene diisocyanate and the benzyl cellulose and polymeric vinyl chloride-vinyl acetate copolymers may be employed in the proportion of from ½ to 10 grams for each 100 grams of the meta-toluene diisocyanate. For certain specific applications we have found that 2 grams, 4 grams and 6 grams, respectively, of the thermoplastic resin additives for each 100 grams of the meta-toluene diisocyanate are valuable in obtaining products of the desired physical properties and characteristics. Ethyl cellulose has been found to be particularly desirable in the formulations of the invention. Satisfactory results are obtained using commercial grades of ethyl cellulose resins wherein the substitution values are between 2.15 and 2.60 ethoxyl groups for each glucose unit, that is where the ethoxyl content is from 35% to 50%. A preferred ethoxyl content range of the ethyl cellulose resin is from 45.0 to 49.5%. The concentration of the ethyl cellulose in the reactant alkyd resin-meta-toluene diisocyanate systems of the invention is from 0.03 gram to 15 grams of the ethyl cellulose for each 100 grams of the meta-toluene diisocyanate, a preferred concentration of the ethyl cellulose being between ½ and 6 grams for each 100 grams of the diisocyanate.

High molecular weight polyisocyanate resinous agents may be employed in the formulations of the invention if desired. In our copending application Serial No. 71,037, filed January 14, 1949, we have disclosed such high molecular weight polyisocyanates that may be employed either individually with the alkyd resin or in conjunction with pure meta-toluene diisocyanate and the alkyd resin and in the case of the present invention the bentonite complexes may be incorporated in such formulations as foam stabilizing additives. The high molecular weight isocyanates just mentioned are the reaction products of meta-toluene diisocyanate and compounds having more than one functional group or radicals, each of which contains at least one labile hydrogen atom that will react with the meta-toluene diisocyanate by addition polymerization. Although the present invention is not directly concerned with the use of these high molecular weight reaction products, we wish to point out that the bentonite complexes to be described below may be employed in the reactant cellular plastic producing formulations incorporating such high molecular weight reaction products.

The present invention contemplates the use of quaternary ammonium bentonite complexes or bentonite salts of quaternary ammonium compounds as foam stabilizers for the reactant diisocyanate-alkyd resin or oxalate resin mixtures. These bentonite complexes or salts are produced by the reaction of bentonite with organic bases or salts of organic bases through base exchange wherein the calcium, sodium, potassium, magnesium, or other replaceable bases of the silicate of the bentonite enter into double decomposition with cations of organic bases. Such bentonite complexes may be considered bentonite salts of quaternary ammonium compounds and are manufactured by the National Lead Company of New York, New York. For the purpose of simplifying their identification the bentonite complexes may be given the trade name "Bentone" with the numerals following the name "Bentone" designating the number of carbon atoms in the quaternary compound from which the bentonite complex is derived. Thus "Bentone 34" is a quaternary ammonium bentonite compound obtained through base exchange between bentonite and dimethyl dihexadecyl ammonium chloride. The bentonite salts of quaternary ammonium compounds which we have found to be useful and effective as foam stabilizers in the alkyd resin or oxalate resin-diisocyanate reactant mixtures include:

(1) Bentone 26—Dimethyl didodecyl ammonium bentonite.
(2) Bentone 30—Dimethyl dodecyl hexadecyl ammonium bentonite.
(3) Bentone 34—Dimethyl dihexadecyl ammonium bentonite.
(4) Bentone 36—Dimethyl hexadecyl octadecyl ammonium bentonite.
(5) Bentone 38—Dimethyl dioctadecyl ammonium bentonite.

The quaternary ammonium radical of these dimethyl alkyl quaternary ammonium complexes may be represented as follows:

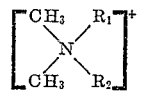

the sum of the carbon atoms being between 26 and 38 and preferably between 30 and 36. This reaction can be descriptively portrayed as one of base exchange in the following:

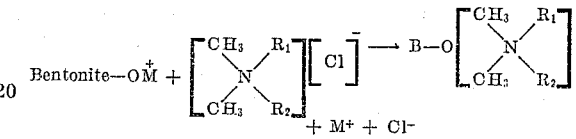

where M represents a univalent cation such as sodium but may represent multivalent cations such as calcium, magnesium or other replaceable bases of the silicate constituent of the bentonite.

The present invention is not primarily concerned with the manner of preparing the bentonite salts of quaternary ammonium compounds. One manner of preparing the bentonite salts the montmorillonite of the bentonite is separated from the non-clay constituents of the bentonite by dispersing 118 grams of the bentonite in 3 liters of water and after standing for approximately one hour, the water dispersion is decanted, leaving behind the non-clay sediment. The organophilic bentonites are then prepared through base exchange by reacting salts of the organic bases and quaternary ammonium salts with the clay dispersions, producing as precipitates the insoluble organic silicates which are finally washed, filtered, dried and pulverized.

The Bentones or quaternary ammonium bentonite compounds or complexes may be used individually or in suitable mixtures or blends in the reactant diisocyanate-alkyd resin or oxalate resin reactant mixtures in the proportion of from 1½ to 15 grams for each 100 grams of the resin. While each of the above named quaternary ammonium bentonite complexes or compounds have been found to be effective foam stabilizers in the reactant cellular plastic producing mixtures, the best results have been obtained with "Bentone 34"—dimethyl dihexadecyl ammonium bentonite. The following are typical examples of the formulations of the invention for producing the foamed or cellular alkyd resin-diisocyanate reaction products:

*Example I*

| | Grams |
|---|---|
| Resin C having an acid number of 10 and a water content of 1½% by weight | 30 |
| Meta-toluene diisocyanate | 25 |
| Bentone 34 | 3 |

*Example II*

| | Grams |
|---|---|
| Resin C having an acid number of 20 and a water content of 1% by weight | 30 |
| Meta-toluene diisocyanate containing 2 parts by weight of 100 centipoise viscosity ethyl cellulose, having an ethoxy content of from 46.8 to 48.5% by weight, for each 100 parts by weight of the meta-toluene diisocyanate | 25 |
| Diallyl phenyl phosphonate | 2½ |
| Bentone 34 | 3 |
| Benzoyl peroxide | 0.125 |

Example III

| | Grams |
|---|---|
| Resin A having an acid number of 18 and a water content of 1% by weight | 30 |
| Meta-toluene diisocyanate | 20 |
| Diallyl phenyl phosphonate | 5 |
| Benzoyl peroxide | 0.25 |
| Bentone 34 | 3 |

Example IV

| | Grams |
|---|---|
| Resin A having an acid number of 18 and a water content of 0.85% by weight | 30 |
| Meta-toluene diisocyanate | 20 |
| Bentone 34 | 1 |

Example V

| | Grams |
|---|---|
| Resin A having an acid number of 18 and a water content of 0.85% by weight | 30 |
| Meta-toluene diisocyanate | 20 |
| Bentone 30 | 5 |

Example VI

| | Grams |
|---|---|
| Resin B having an acid number of 17.5 and a water content of 0.56% by weight | 30 |
| Meta-toluene diisocyanate | 20 |
| Bentone 36 | 3 |

Example VII

| | Grams |
|---|---|
| Resin A having an acid number of 18 and a water content of 0.85% by weight | 30 |
| Metallic leafing powder | 1 |
| Meta-toluene diisocyanate | 20 |
| Bentone 34 | ½ |

The leafing powder in Example VII may preferably be aluminum leafing powder.

Example VIII

| | Grams |
|---|---|
| Resin C having an acid number of 15 and a water content of 1% by weight | 30 |
| Metallic soap powder | 1 |
| Bentone 34 | 1 |
| Meta-toluene diisocyanate | 20 |

The metallic soap powder employed in Example VIII may preferably be zinc stearate powder.

Example IX

| | Grams |
|---|---|
| Resin C having an acid number of 10 and a water content of 1½% by weight | 30 |
| Meta-toluene diisocyanate containing 2 parts by weight of 100 centipoise viscosity ethyl cellulose, having an ethoxy content of 46.8 to 48.5% by weight, per 100 parts by weight of the meta-toluene diisocyanate | 10 |
| Meta-toluene diisocyanate | 15 |
| Bentone 34 | 1 |
| Aluminum leafing powder | 2 |

Example X

| | Grams |
|---|---|
| Resin A having an acid number of 18 and a water content of 0.85% by weight | 30 |
| Metallic leafing powder | 1 |
| Metallic soap powder | 0.25 |
| Meta-toluene diisocyanate | 25 |
| Bentone 34 | 1 |

Preferred metallic leafing powder is aluminum. Preferred metallic soap powder is zinc stearate.

In preparing the reactant mixtures the ingredients are simply thoroughly mixed together and the mixture is then poured in place or otherwise applied. The poured or applied mixture is then allowed to react at atmospheric pressure either with or without the application of external heat or attended by a moderate heating of, say, between 120° and 150° F. depending upon the size of the batch. The mixture is allowed to react and the reaction is allowed to go on to completion to produce the foamed cellular product, a post-curing of from 10 to 20 hours at a temperature of from 125° to 250° F. may be desirable in some instances to obtain a stronger, more solvent resistant and more heat stable cellular plastic material. The bentonite complexes stabilize the rising foam structure, preventing collapse of the cells, and minimizing loss of the gas. Thus the bentonite complexes materially contribute to the production of a cellular product of low density, high strength, having closed or non-communicating cells of substantially uniform size and of generally spherical configuration. As above pointed out the effectiveness of the bentonite complexes in stabilizing the foam may be due to their ability to swell and disperse in the meta-toluene diisocyanate and may be due to their acting as catalytic agents through the quaternary ammonium group as well as the metallic constituents that are soluble to some extent in the meta-toluene diisocyanate as part of the bentonite complex. The cellular products of course have numerous applications being suitable for use in radomes except in the case of the reactant products containing leafing powders, internal fillers and reinforcements for aircraft parts, structural sandwich panels, etc.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; and from 1.5 to 15 parts by weight of a quaternary ammonium salt of bentonite having from 26 to 38 total carbon atoms, for each 100 parts by weight of said resin.

2. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; and from 1.5 to 15 parts by weight of dimethyl dihexadecyl ammonium bentonite for each 100 parts by weight of said resin.

3. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; from $\frac{1}{16}$ to 7½ parts by weight of metallic leafing powder selected from the group consisting of aluminum, aluminum isobronze, gold bronze, copper bronze, lead, nickel, silver, gold, copper and stainless steel leafing powders for each 30 parts of weight of said resin; and from 1.5 to 15 parts by weight of a quaternary ammonium salt of bentonite, having from 26 to 38 total carbon atoms, for each 100 parts by weight of said resin.

4. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; from $\frac{1}{16}$ to 7½ parts by weight for each 30 parts by weight of said resin of a metallic soap powder selected from the group consisting of zinc stearate, aluminum stearate, calcium stearate, magnesium stearate, magnesium hydroxy stearate, barium stearate, zinc laurate, calcium oleate and strontium stearate of a fatty acid having from 12 to 20 carbon atoms; and from 1.5 to 15 parts by weight of a quaternary ammonium salt of bentonite, having from 26 to 38 total carbon atoms, for each 100 parts by weight of said resin.

5. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; from $\frac{1}{16}$ to 5 parts by weight of metallic leafing powder selected from the group consisting of aluminum, aluminum bronze, gold bronze, copper bronze, lead, nickel, silver, gold, copper and stainless steel leafing powders for each 30 parts by weight of said resin; from $\frac{1}{16}$ to 5 parts by weight of metallic soap powder selected from the group consisting of zinc stearate, aluminum stearate, calcium stearate, magnesium stearate, magnesium hydroxy stearate, barium stearate, zinc laurate, calcium oleate and strontium stearate for each 30 parts by weight of said resin; and from 1.5 to 15 parts by weight of a quaternary ammonium salt of bentonite, having from 26 to 38 total carbon atoms, for each 100 parts by weight of said resin.

6. The cellular reaction product of 30 parts by weight of an oxalate alkyd resin prepared from 2½ mols oxalic acid, $\frac{1}{16}$ mol dimeric polymers of unsaturated fatty acids and $3\frac{9}{16}$ mols trimethylol propane; 25 parts by weight meta-toluene diisocyanate; and 3 parts by weight dimethyl dihexadecyl ammonium bentonite.

7. The cellular reaction product of 30 parts by weight of an oxalate alkyd resin having an acid number of 10 and a water content of approximately 1½% by weight prepared from 2½ mols oxalic acid, $\frac{1}{16}$ mol dimeric polymers of unsaturated fatty acids and $3\frac{9}{16}$ mols trimethylol propane; 25 parts by weight meta-toluene diisocyanate; and 3 parts by weight dimethyl dihexadecyl ammonium bentonite.

8. The cellular reaction product of 30 parts by weight of an oxalate alkyd resin prepared from 2½ mols oxalic acid, $\frac{1}{16}$ mol dimeric polymers of unsaturated fatty acids and $3\frac{9}{16}$ mols trimethylol propane; 25 parts by weight meta-toluene diisocyanate containing 2 parts by weight ethyl cellulose soluble in the meta-toluene diisocyanate and having an ethoxy content of from 48.0 to 49.5% for each 100 parts by weight of the meta-toluene diisocyanate; 2½ parts by weight of diallyl phenyl phosphonate; 3 parts by weight dimethyl dihexadecyl ammonium bentonite; and a modicum of benzoyl peroxide.

9. The cellular reaction product, on an approximate weight basis, of 30 parts of an alkyd resin having a water content of approximately 1% by weight, an acid number of approximately 18 and prepared from 4 mols trimethylol propane, 2½ mols adipic acid and ½ mol phthalic anhydride; 20 parts meta-toluene diisocyanate; 5 parts diallyl phenyl phosphonate, ¼ part benzoyl peroxide; and 3 parts dimethyl dihexadecyl ammonium bentonite.

10. The cellular reaction product, on an approximate weight basis, of 30 parts of an alkyd resin having a water content of approximately 0.85% by weight, an acid number of approximately 18 and prepared from 4 mols trimethylol propane, 2½ mols adipic acid and ½ mol phthalic anhydride; 20 parts meta-toluene diisocyanate; and 1 part by weight of dimethyl dihexadecyl ammonium bentonite.

11. The cellular reaction product, on an approximate weight basis, an alkyd resin having a water content of approximately 0.85% by weight, an acid number of approximately 18 and prepared from 4 mols trimethylol propane, 2½ mols adipic acid and ½ mol phthalic anhydride; from 35 to 150 parts meta-toluene diisocyanate for each 100 parts of the resin; and from 1.5 to 15 parts dimethyl dodecyl hexadecyl ammonium bentonite for each 100 parts of the resin.

12. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; and from 1.5 to 15 parts by weight of dimethyl didodecyl ammonium bentonite for each 100 parts by weight of said resin.

13. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin; and from 1.5 to 15 parts by weight for each 100 parts by weight of the resin of a quaternary ammonium bentonite complex chosen from the group consisting of: dimethyl didodecyl ammonium bentonite, dimethyl dodecyl hexadecyl ammonium bentonite, dimethyl dihexadecyl ammonium bentonite, dimethyl hexadecyl octadecyl ammonium bentonite, dimethyl dioctadecyl ammonium bentonite.

14. A foamed cellular plastic material comprising the reaction product of an alkyd resin having a water content of from 0.1 to 3% by weight, having an acid number of from 5 to 175 and wherein the ratio range of the hydroxyl groups to the carboxyl groups in the alkyd resin reactants is from 3(OH):1(COOH) to 4(OH) to 5(COOH); from 35 to 150 parts by weight of meta-toluene diisocyanate for each 100 parts by weight of said resin, from 0.03 to 20 parts by weight for each 100 parts by weight of the meta-toluene diisocyanate of a high molecular weight polymeric thermoplastic resin chosen from the group consisting of: ethyl cellulose, chlorinated natural rubber, benzyl cellulose, natural rubber, vinyl chloride-vinyl acetate copolymers, polyvinyl chloride, polyvinyl acetate, polystyrene, polydichloro styrene, polyvinyl butyral, and from 1.5 to 15 parts by weight of a quaternary ammonium salt of bentonite, having from 26 to 38 total carbon atoms, for each 100 parts by weight of said alkyd resin.

ELI SIMON.
FRANK W. THOMAS.

No references cited.